US011106588B2

(12) United States Patent
Brown et al.

(10) Patent No.: US 11,106,588 B2
(45) Date of Patent: Aug. 31, 2021

(54) DEFERRED METHOD OF ALLOCATING DISK SPACE FOR LIGHTNING SEGMENTS

(71) Applicant: International Business Machines Corporation, Armonk, NY (US)

(72) Inventors: William A. Brown, Pine Island, MN (US); Michael Corrigan, Rochester, MN (US); Kevin C. Griffin, Stewartville, MN (US); Glen W. Nelson, Rochester, MN (US); David G. Carlson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 15/824,769

(22) Filed: Nov. 28, 2017

(65) Prior Publication Data
US 2019/0163635 A1    May 30, 2019

(51) Int. Cl.
*G06F 3/06* (2006.01)
*G06F 16/13* (2019.01)
(Continued)

(52) U.S. Cl.
CPC ........ *G06F 12/0842* (2013.01); *G06F 3/0689* (2013.01); *G06F 12/0246* (2013.01);
(Continued)

(58) Field of Classification Search
CPC ............... G06F 12/0842; G06F 16/137; G06F 12/0246; G06F 12/0866; G06F 3/0689; G06F 2212/6042; G06F 2212/7202
See application file for complete search history.

(56) References Cited

U.S. PATENT DOCUMENTS 5,551,001 A * 8/1996 Cohen ................. G06F 12/0848
711/122
6,226,715 B1 * 5/2001 Van Der Wolf ...... G06F 12/121
711/133
(Continued)

FOREIGN PATENT DOCUMENTS

CN    103577470 A    2/2014

OTHER PUBLICATIONS

Barrett et al., "Using Lifetime Predictors to Improve Memory Allocation Performance," SIGPLAN'93 Conference on Programming Language Design and Implementation, Jun. 1993, 11 pages.
(Continued)

*Primary Examiner* — Christopher D Birkhimer
(74) *Attorney, Agent, or Firm* — Patterson + Sheridan, LLP

(57) ABSTRACT

Embodiments are provided for deferring allocation of storage for segments. The method includes receiving, at a first moment in time, a request to allocate a first segment within a memory. Information corresponding to the first segment is stored in a first entry in a hash table, and memory is allocated for the first segment. Information about the first segment is returned to an entity that requested the allocation of the first segment, where the first segment is not allocated auxiliary storage until predefined criteria are satisfied. At a second moment in time, upon receiving an indication to deallocate the first segment, memory corresponding to the first segment is deallocated, where the first segment is never allocated auxiliary storage and the first entry in the hash table is deleted.

20 Claims, 7 Drawing Sheets

(51) Int. Cl.
*G06F 12/0888* (2016.01)
*G06F 12/0871* (2016.01)
*G06F 12/0868* (2016.01)
*G06F 12/0866* (2016.01)
*G06F 12/0864* (2016.01)
*G06F 12/0842* (2016.01)
*G06F 12/02* (2006.01)

(52) U.S. Cl.
CPC ........ *G06F 12/0866* (2013.01); *G06F 16/137* (2019.01); *G06F 2212/6042* (2013.01); *G06F 2212/7202* (2013.01)

(56) References Cited

U.S. PATENT DOCUMENTS

| | | | | |
|---|---|---|---|---|
| 6,425,057 | B1* | 7/2002 | Cherkasova | G06F 12/121 711/134 |
| 6,442,682 | B1 | 8/2002 | Pothapragada et al. | |
| 7,231,496 | B2* | 6/2007 | Curtis | G06F 12/0862 711/118 |
| 8,645,654 | B1* | 2/2014 | Bailey | G06F 3/0605 711/165 |
| 8,793,449 | B1* | 7/2014 | Kimmel | G06F 12/00 711/114 |
| 8,856,552 | B2* | 10/2014 | Dhuse | G06F 11/1092 713/193 |
| 8,886,909 | B1* | 11/2014 | De Forest | G06F 3/061 711/170 |
| 8,966,191 | B2* | 2/2015 | Flynn | G06F 3/061 711/154 |
| 9,058,123 | B2 | 6/2015 | Joshi et al. | |
| 9,152,489 | B2* | 10/2015 | Baptist | G06F 11/1092 |
| 9,165,005 | B2 | 10/2015 | Beaverson et al. | |
| 9,170,751 | B2* | 10/2015 | Kimmel | G06F 12/00 |
| 9,213,673 | B2* | 12/2015 | Lee | G06F 15/167 |
| 9,218,287 | B2* | 12/2015 | Miyazaki | G06F 12/0804 |
| 9,250,817 | B2* | 2/2016 | Flynn | G06F 3/061 |
| 9,323,465 | B2* | 4/2016 | Flynn | G06F 3/061 |
| 9,411,530 | B1* | 8/2016 | Bailey | G06F 3/0605 |
| 9,471,228 | B2* | 10/2016 | van Riel | G06F 3/061 |
| 9,501,341 | B2* | 11/2016 | Dhuse | G06F 11/1092 |
| 9,575,901 | B2* | 2/2017 | Damodaran | H03K 19/0016 |
| 9,697,130 | B2* | 7/2017 | Karippara | G06F 9/45533 |
| 9,811,405 | B2* | 11/2017 | Motwani | G06F 11/1092 |
| 2011/0161681 | A1* | 6/2011 | Dhuse | G06F 11/1092 713/193 |
| 2011/0161754 | A1* | 6/2011 | Baptist | G06F 11/1092 714/718 |
| 2012/0210043 | A1* | 8/2012 | Joshi | G06F 9/45558 711/6 |
| 2012/0297147 | A1* | 11/2012 | Mylly | G06F 12/0246 711/143 |
| 2013/0073821 | A1* | 3/2013 | Flynn | G06F 3/061 711/162 |
| 2013/0226997 | A1* | 8/2013 | Lee | G06F 15/167 709/203 |
| 2014/0025872 | A1* | 1/2014 | Flynn | G06F 3/061 711/103 |
| 2014/0068183 | A1* | 3/2014 | Joshi | G06F 12/0866 711/114 |
| 2014/0068197 | A1* | 3/2014 | Joshi | G06F 12/0866 711/135 |
| 2014/0156909 | A1* | 6/2014 | Farhan | G06F 12/0862 711/103 |
| 2014/0223096 | A1* | 8/2014 | Zhe Yang | G06F 12/0871 711/114 |
| 2014/0237147 | A1* | 8/2014 | Joshi | G06F 12/0866 710/74 |
| 2014/0325260 | A1* | 10/2014 | Gladwin | G06F 11/1092 714/6.13 |
| 2014/0325305 | A1* | 10/2014 | Motwani | G06F 11/1092 714/759 |
| 2014/0337565 | A1* | 11/2014 | Kimmel | G06F 12/00 711/103 |
| 2014/0344507 | A1* | 11/2014 | Piggin | G06F 12/0246 711/103 |
| 2014/0379675 | A1* | 12/2014 | Dhuse | G06F 11/1092 707/703 |
| 2015/0160879 | A1* | 6/2015 | Flynn | G06F 3/061 711/103 |
| 2016/0132414 | A1* | 5/2016 | Cho | G06F 11/263 714/28 |
| 2016/0147443 | A1* | 5/2016 | van Riel | G06F 3/061 |
| 2017/0277634 | A1* | 9/2017 | Basu | G06F 12/0811 |

OTHER PUBLICATIONS

Sweeney et al., "Scalability in the XFS File System," Proceedings of the USENIX 1996 Annual Technical Conference, Jan. 1996, 14 pages.

Dittrich et al., "Indexing Moving Objects using Short-Lived Throwaway Indexes," SSTD, v.9, 2009, pp. 189-207.

Ren et al., "TableFS: Enhancing Metadata Efficiency in the Local File System," 2013 USENIX Annual Technical Conference (USENIX ATC'13), 2013, pp. 145-156.

* cited by examiner

DEFERRED METHOD OF ALLOCATING DISK SPACE FOR LIGHTNING SEGMENTS

BACKGROUND

The present disclosure relates to computer memory management, and more specifically, to allocating memory segments while selectively deferring allocation of disk space.

When memory segments are allocated by a computing system, an equal amount of space on an auxiliary storage device is allocated as a backing store. This allows the entire segment to be written out to storage if required, e.g., when swapping segments into and out of memory (e.g., random access memory). While memory operations are typically very fast, auxiliary storage operations are frequently much slower. Auxiliary storage generally includes hard disks, optical disks, solid state drives, direct access storage devices (DASD), and the like. In many instances, memory can be cleared and allocated more than one hundred times faster than the equivalent space in auxiliary storage can be cleared. Additionally, over time the auxiliary storage becomes fragmented which results in increased processing resources required to allocate storage. These problems can dramatically slow down the allocation of new segments, and harm the efficiency of computing systems.

SUMMARY

According to one embodiment described herein, a computer-readable storage medium is disclosed. The computer-readable storage medium has computer-readable program code embodied therewith, the computer-readable program code executable by one or more computer processors to perform an operation. The operation includes receiving, at a first moment in time, a request to allocate a first segment within a memory. Next, information corresponding to the first segment is stored in a first entry in a hash table and memory is allocated for the first segment. Then, information about the first segment is returned to an entity that requested the allocation of the first segment, where the first segment is not allocated auxiliary storage until predefined criteria are satisfied. At a second moment in time, upon receiving an indication to deallocate the first segment, memory corresponding to the first segment is deallocated, where the first segment is never allocated auxiliary storage and the first entry in the hash table is deleted.

Other embodiments include, without limitation, a method and a system having a processor, memory, and application programs configured to implement aspects of the present disclosure.

DETAILED DESCRIPTION

Allocation of memory segments generally requires allocation of an equal amount of auxiliary storage space, which is a significant drain on computing resources. Further, a significant portion of new segments, particularly smaller ones, are never written to auxiliary storage before being deallocated. Thus, the resources and time required to allocate the auxiliary storage is entirely wasted. In order to help improve the functioning of the computing system, embodiments herein provide methods for deferring the allocation of auxiliary storage for certain segments.

Figure 1:
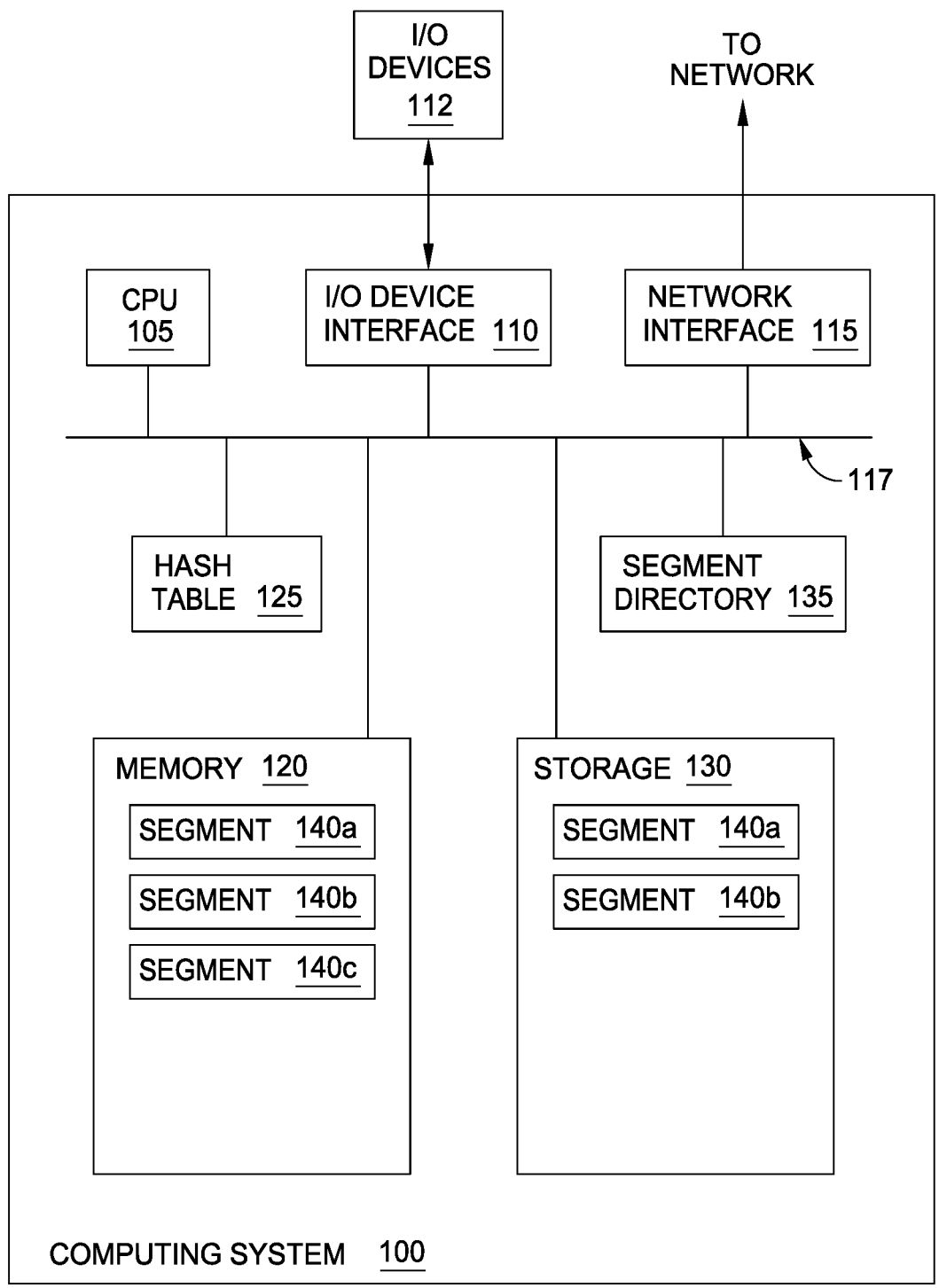
FIG. 1 is a system diagram illustrating an environment capable of implementing some embodiments of the present disclosure.

With reference now to FIG. 1, a system diagram illustrating a Computing System 100 is presented. As shown, Computing System 100 includes a central processing unit (CPU) 105, a Network Interface 115, a Memory 120, a Storage 130, a Hash Table 125, and a Segment Directory 135, each connected to a Bus 117. The Computing System 100 may also include an I/O Device Interface 110 connecting I/O Devices 112 (e.g., keyboard, display, and mouse devices) to the Computing System 100. Further, Computing System 100 may correspond to a physical computing system in the context of the present disclosure, and may operate in a cloud computing environment.

CPU 105 retrieves and executes programming instructions stored in Memory 120, and also stores and retrieves application data residing in Storage 130. The Bus 117 is used to transmit programming instructions and application data between CPU 105, I/O Devices Interface 110, Storage 130, Network Interface 117, Memory 120, Hash Table 125, and Segment Directory 135. Note that CPU 105 is representative of a single CPU, multiple CPUs, a single CPU having multiple processing cores, and the like. Memory 120 is generally included to be representative of a random access memory. Storage 130 may be a disk drive storage device, solid state drive, or the like. Although shown as a single unit, Storage 130 may be a combination of fixed and/or removable storage devices, such as fixed disc drives, removable memory cards, or optical storage, network attached storage (NAS), or a storage area-network (SAN). Storage 130 is also referred to herein as auxiliary storage.

Although Hash Table 125 and Segment Directory 135 are illustrated as separate components within Computing System 100 for emphasis, in some embodiments one or both may be embodied within Memory 120, Storage 130, or any other storage location accessible by Computing System 100. Illustratively, Memory 120 includes several Segments 140a, 140b, and 140c and Storage 130 includes Segments 140a and 140b. That is, Memory 120 has sufficient storage space allocated to store Segments 140a, 140b, and 140c, although some or all of each segment may in fact be empty without meaningful data written to memory. Similarly, Storage 130 has space allocated and cleared for each of Segment 140a and 140b, though there may in fact not be any data from the respective segments written to Storage 130 at this time.

Generally, a "segment" refers to a section of memory in a Computing System 100. In an embodiment, a segment may be any length, but is typically a number of pages long, where a page is a fixed-length block of memory. A page may be, for example, 4,096 bytes (4 kilobytes) long. In an embodiment, when an application, program, client, user, or other entity needs to store data, it requests a segment be allocated, and specifies the length required. In an embodiment, all segments must be an integer number of pages in length, which facilitates memory management. For example, an operating system may require 14 kilobytes of storage, and thus request a segment that is four pages long, or 16,384 bytes. Typically, when a segment is requested, Computing System 100 first creates an entry in Segment Directory 135. In an embodiment, each directory entry in Segment Directory 135 corresponds to a segment of memory, and includes various information about the segment and information necessary to control access to the segment, including the location of its storage allocation. For example, a directory entry may include a segment identifier, the length of the segment, the location of the segment in Memory 120, and the space in Storage 130 that is allocated for the segment. The entry may also include such information as the type of data, any storage protections, and the like.

In one embodiment, sufficient space in Storage 130 is cleared of all existing junk data and allocated for the segment. Space in Memory 120 is also allocated for the segment, and the segment is returned to the requesting entity. That is, a pointer to the segment, or some other information to access the segment is returned. Typically, while in use, the requesting entity reads and writes to the segment in Memory 120 until the segment is destroyed or deallocated because it is no longer needed. At times, however, it is necessary to write the segment out to Storage 130. This could occur for a variety of reasons, such as at the request of a user or entity that controls the segment. Additionally, if it becomes necessary to swap the segment out of Memory 120 in order to clear up memory for other segments, it will of course be necessary to write the segment to Storage 130.

Frequently, however, segments are created, used, and deallocated in Memory 120, without any data for the segment being written to Storage 130. As a result, computing resources are frequently wasted, as significant time and resources may be spent to allocate and clear the corresponding space within the Storage 130. For example, in an embodiment, Memory 120 provides much faster read and write access than Storage 130. Thus, it is far quicker to allocate Memory 120 than it is to allocate Storage 130. Additionally, these delays can be exacerbated if the Storage 130 is located remotely, and the Computing System 100 suffers from transmission delays as well. Further, in some embodiments, Storage 130 represents one or more solid state drives (SSD) which have a limited number of read/write cycles that can be performed before the Storage 130 is no longer reliable. Storage 130 may also represent other types of storage that degrade when written to, such that only a limited number of writes may be performed. In such an embodiment, it is wasteful to clear and allocate Storage 130 that will never be used, as it degrades the device without any corresponding benefit.

As is illustrated in FIG. 1, embodiments of the present disclosure enable deferring allocation of storage for new segments. In the illustrated embodiment, a segment (such as Segment 140c) can be allocated in Memory 120 without allocating any auxiliary space in Storage 130. This significantly improves the operation of Computing System 100, as it reduces the time and resources required to allocate new segments, and prevents unnecessary read and write cycles to auxiliary storage.

Figure 2A:
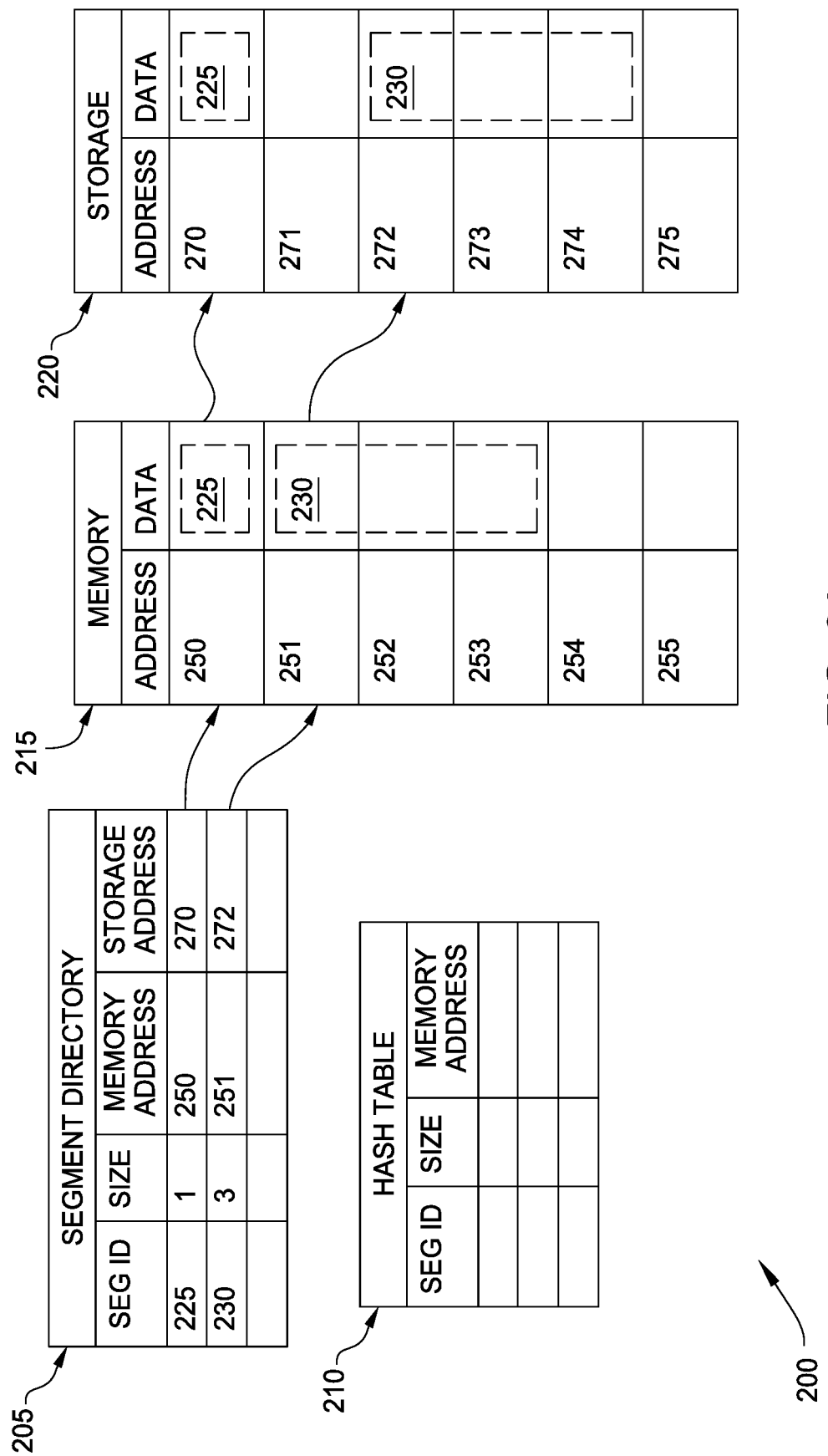
FIG. 2a is a block diagram illustrating one implementation of segmented memory, according to one embodiment of the present disclosure.

FIG. 2a illustrates a block diagram of an embodiment of the present disclosure. The environment 200 includes a Segment Directory 205, a Hash Table 210, Memory 215, and Storage 220. In the illustrated embodiment, Segment Directory 205 contains entries referring to two segments: Segment 225 and Segment 230. Segment 225 has a length of one page, and is located at Memory 215 address 250. The Segment 225 has auxiliary Storage 220 space allocated at address 270. Similarly, Segment 230 is three pages in length, and is located at address 251 in Memory 215. Segment 230 has three pages of space allocated in Storage 220 at location 272. In the illustrated embodiment, each page in Memory 215 is the same length as a sector in Storage 220. In one embodiment, each page is 4,096 bytes long. Of course, the pages can be any length and need not be the same length as each sector in Storage 220. Additionally, to simplify the illustration, each page in Memory 215 is addressed by a number (e.g., 250, 251, . . . 255), as is each sector in Storage 220 (e.g., 270, 271, . . . 275).

Although Segments 225 and 230 have portions of Storage 220 allocated to them, as illustrated in FIG. 2a, they may or may not have any data actually written to Storage 220. That is, the illustrated boxes in Storage 220 indicate only that space has been allocated to the Segments 225 and 230, not necessarily that data has been written out to Storage 220. In an embodiment, allocation of Storage 220 includes searching Storage 220 for sufficient free space for the Segment 225 or 230, clearing that space of old data that may still be present in the sector, and allocating the space to the respective Segment 225 or 230. In some embodiments, the free space must be contiguous for a given segment, as fragmentation of segments is not desirable for some systems and/or applications. That is, in such an embodiment, a segment that is two pages long cannot have Sectors 271 and 275 allocated to it, because they are not contiguous. In other embodiments, however, segments may be split across noncontiguous sectors.

Although not depicted in the illustrated embodiment, some embodiments provide additional information in each entry in Segment Directory 205. For example, in some embodiments, the entry further includes information such as the type of data stored in the segment, the process or entity that requested or created the segment, any read or write protections applicable to the segment, and any other information needed to control access to the segment.

In order to allocate the Storage 220 space for Segments 225 and 230, the Computing System 100 can search for free auxiliary storage space and clear out any existing junk data from previous operations. This is a resource-intensive and slow process, as compared to allocating Memory 215. In some embodiments, a new segment can be written to Storage 220 in noncontiguous blocks. For example, a two-page segment could be allocated Sectors 271 and 275. However, distributing a segment across multiple noncontiguous sectors increases the time required to access the segment, and worsens disk fragmentation.

As illustrated, although Segments 225 and 230 are contiguous in Memory 215 (e.g., they do not have empty or unused memory space between them), they are not contiguous in Storage 220 (e.g., there are one or more empty or unused sectors, Sector 271, between the Segments 225 and 230). This can be the result of a variety of factors, and can be referred to as fragmentation. In use, as segments are allocated and deallocated in Memory 215 and Storage 220, the address spaces grow increasingly fragmented. For example, a one-page long segment with Sector 271 allocated as backing storage may have recently been deallocated, leaving an unused block of Storage 220 in the middle of the useable address space. The more frequently segments are allocated and deallocated in Storage 220, the greater the disk fragmentation may be. This can cause slowdowns and crashes in a computing system.

Figure 2B:
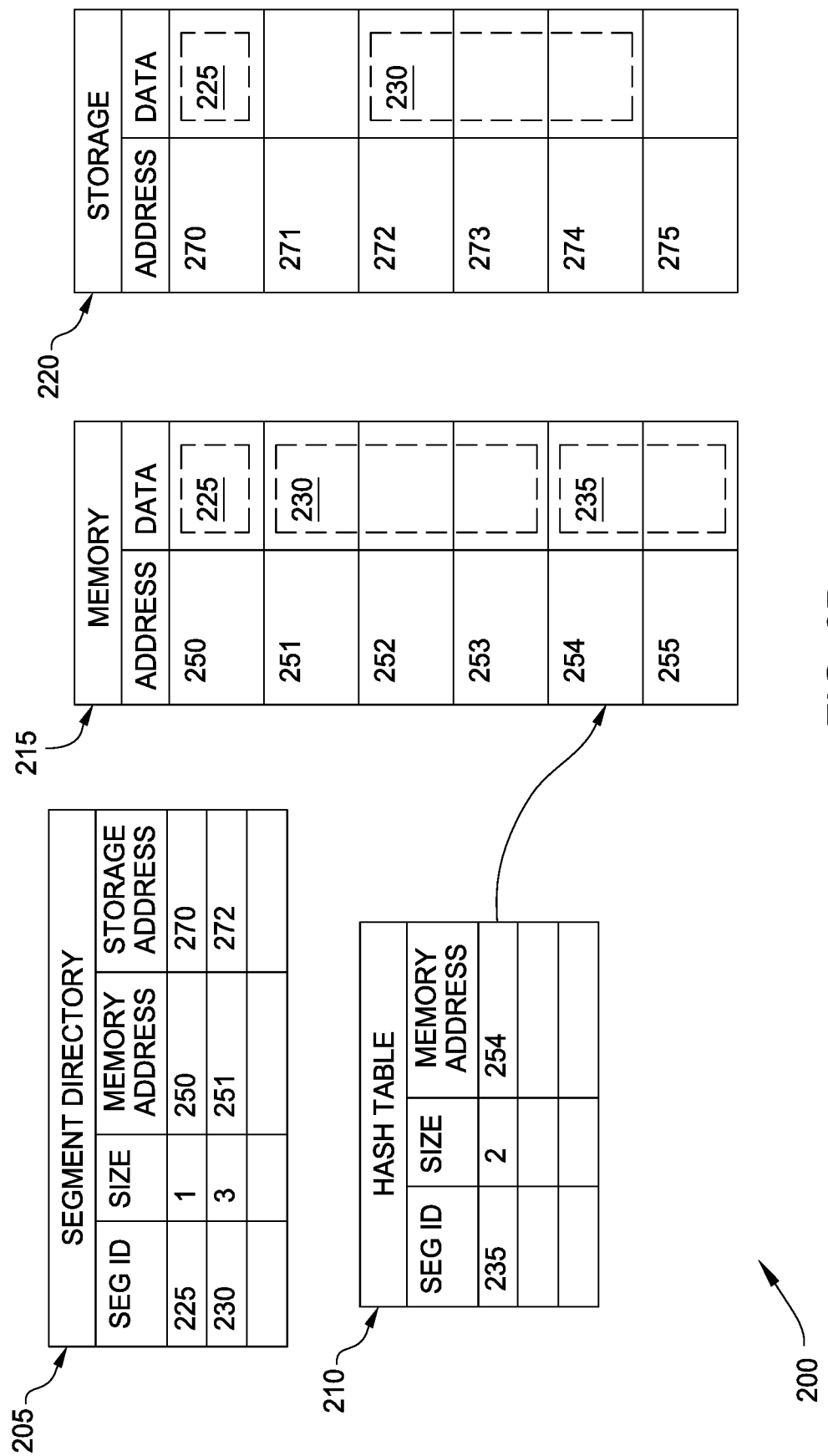
FIG. 2b is a block diagram illustrating a method of deferring allocation of disk storage, according to one embodiment disclosed herein.

FIG. 2b illustrates a block diagram of one embodiment of the present disclosure. In order to prevent unnecessary allocation of Storage 220 and increase the speed with which segments can be allocated, a Hash Table 210 is used. When a new segment is created, embodiments of the present disclosure create an entry in Hash Table 210 containing the information necessary to control access to the segment. In embodiments, reading and writing to data in a hash table like Hash table 210 is an extremely quick and efficient way of managing data like access information of a segment. Thus, an entry in Segment Directory 205 is not created at the time of creation of a new segment, and a hash entry is instead created. Importantly, no Storage 220 is allocated for the new segment, which dramatically improves the time and resources required to allocate the segment, and reduces disk fragmentation. In some embodiments, Storage 220 may be allocated at a later time. This is discussed in more detail below.

In the illustrated embodiment of FIG. 2b, a new Segment 235 has been requested by some application, program, operating system, client, or other computing entity. Rather than creating an entry in Segment Directory 205, however, the virtual address of the new Segment 235 is hashed and an entry in Hash Table 210 is created. Although not depicted in the illustrated embodiment, the Hash Table 210 may contain additional information needed to control access to the segment in alternate embodiments. For example, each entry in Hash Table 210 could also include information about the type of data that makes up the segment, the process that requested allocation of the segment, any read and write protections, and the like. In the illustrated embodiment, the new Segment 235 is two pages in length.

As further illustrated in FIG. 2b, Segment 235 has Memory 215 allocated at addresses 254 and 255. Additionally, the system 200 is deferring allocation of auxiliary storage for the new Segment 235. Thus, as illustrated, there is no space allocated in Storage 220 for Segment 235. This deferment may be triggered by a wide variety of criteria. In one embodiment, both allocation of Storage 220 and creation of a Segment Directory 205 entry are deferred for all segments that are created, regardless of type, size, source, and the like. In other embodiments, however, only a subset of segments have Storage 220 allocation deferred. In some embodiments, only segments meeting predefined criteria are deferred. In one embodiment, segments are deferred based on the length of the segment. For example, segments smaller than a predefined length are deferred, while segments longer than the predefined length are not. Typically, smaller segments are more likely to be deallocated without ever being written to Storage 220. In one embodiment, all segments that are three pages or less in length are deferred, because segments that size are the most likely to be deallocated without the need for backing storage.

In some embodiments, the size of the segment that triggers deferral can be specified, for example by a user or administrator. For example, a system could initially be configured to defer allocation of Storage 220 for all segments that are two pages or smaller. If an administrator determines that efficiency could be increased, for example because many segments that are three pages long are deallocated from memory without ever writing to Storage 220, the predefined length can be increased to cure the inefficiencies. In another embodiment, allocation of Storage 220 is deferred because the request to create or allocate a segment includes an indication that the segment is temporary. For example, the process creating the segment, or the programmer who wrote the code that creates the segment, may already know that it will be deallocated before needing to be written to Storage 220. In such an embodiment, the segment may be tagged as temporary, such that System 200 can defer allocation of Storage 220, and thereby increase the efficiency of the system.

In another embodiment, the allocation of Storage 220 is deferred for a new segment based on the entity that requested the segment. For example, if a process or application frequently creates segments that are later deallocated before being written to Storage 220, System 200 may begin deferring these segments based on that determination. Alternatively, an administrator or other user could flag these processes or applications for deferral. In another embodiment, System 200 operates to provide resources to a number of clients, for example, in a cloud computing environment. In such an embodiment, certain clients may be tagged so that all segments requested by the client have deferred Storage 220 allocation. The tagging may be, for example, because the client has historically deallocated segments before they are written to Storage 220. Similarly, the client could be tagged for deferred Storage 220 allocation because of some other attribute associated with the client account, such as age, account type, and the like.

Of course, in some embodiments, multiple criteria can be used simultaneously to select which segments should be deferred, including criteria not discussed herein. In each embodiment, the segments (if any) that do not have Storage 220 allocation deferred are processed as normal segments. Specifically, a Segment Directory 205 entry is created for the segment, Storage 220 is allocated for the segment, Memory 215 is allocated for the segment, and the segment is returned to the entity that requested it. Conversely, if a segment is deferred, Storage 220 is not allocated and a Segment Directory 205 entry is not created. Instead, an entry in Hash Table 210 is created. At a later point in time, the deferred segment will either be written to Storage 220 or deallocated.

In many instances, segments that have had allocation of Storage 220 deferred are deallocated or destroyed without being written to storage. Occasionally, however, these segments do eventually have Storage 220 allocated for them. In embodiments, there may be several triggering conditions or predefined criteria that prompt the allocation of Storage 220. In one embodiment, the predefined criteria includes that a predefined amount of time has passed since the segment was initiated. For example, smaller segments are frequently deallocated within a brief period of time, e.g., within 10 milliseconds. In an embodiment, it is very unlikely that a segment would be both created (e.g., have memory allocated for it) and written to storage within such a short period of time. Thus, in the embodiment, segments that are selected to have allocation Storage 220 and creation of an entry in Segment Directory 205 deferred may have Storage 220 allocated only upon determining that a predefined period of time has elapsed. In some embodiments, one hundred milliseconds is a useful limit.

In some embodiments that use time as the predefined criteria, the segments which have not been deallocated after the time period immediately have an entry in Segment Directory 205 and Storage 220 allocated. That is, in some embodiments, each segment may be associated with a timer which triggers the transition upon expiration, or each segment may be associated with a timestamp and a separate process or component can continuously check each segment's timestamp against a system clock to determine whether it is time to create the entry in Segment Directory 205 and allocate Storage 220 for each particular segment. In other embodiments, however, segments may not have the entry in Segment Directory 205 created and allocation of Storage 220 happen immediately upon the passage of the time period. In such an embodiment, for example, there may be a separate process or component, not depicted in FIG. 2b, that periodically checks the entries in Hash Table 210. For each segment in the Hash Table 210 that is old enough, an entry in Segment Directory 205 may be created, and Storage 220 may be allocated.

In this embodiment, though segments are not allocated Storage 220 until the predefined time period has passed, they are not necessarily allocated Storage 220 immediately upon the passing of the period. For example, the process may check the segments in Hash Table 210 every second, or some other periodic check. Each time the segments are checked, all segments that have passed the predefined time period undergo the process to have the respective entry in Segment Directory 205 created and allocation of Storage 220 completed. Advantageously, this may reduce the resources required to check segments, as compared to a continuous process that transitions each segment as soon as the time period has elapsed.

In some embodiments, the predefined criteria that triggers the creation of an entry in Segment Directory 205 and allocation of Storage 220 is based at least in part on determining that the Hash Table 210 is becoming full. In an embodiment, as Hash Table 210 has more entries added, the chance of a collision increases. As used in this embodiment, a collision refers to two or more segments being hashed to the same bucket in the Hash Table 210. Although various methods exist to alleviate the problem of collisions, significant issues can arise when a hash table fills up. Thus, in an embodiment, when it is determined that the number of entries in Hash Table 210 passes a predefined threshold, or that the Hash Table 210 has passed a predefined load factor (based on the number of entries and the total number of buckets in the table), some or all of the segments in the Hash Table 210 have a Segment Directory 205 entry created, and Storage 220 allocated. Once this transition has been accomplished, the accompanying entry in Hash Table 205 is deleted, destroyed, or invalidated.

In some embodiments, when it is determined that the load factor of Hash Table 210 has passed the predefined threshold, all segments associated with entries in Hash Table 210 undergo the transition to Segment Directory 205 and allocation of Storage 220. In other embodiments, however, only a subset of segments are transitioned. For example, in some embodiments, segments are selected at random to be transferred to Segment Directory 205 and have Storage 220 allocated, and the process continues until the load factor is reduced to a predefined level. In another embodiment, segments are selected according to age, with the oldest segments being selected first, until the load factor is at an acceptable level. In some embodiments, segments may be selected according to the size of the segment. For example, larger segments may be selected before smaller segments. Of course, various other methods for selecting which segments should have Storage 220 allocated are included in this embodiment.

In a related embodiment, if it is determined that the load factor for Hash Table 210 exceeds a threshold, any new segments that are created may be processed by creating an entry in Segment Directory 205 and allocating Storage 220.

That is, in addition to or instead of transitioning segments that are currently listed in Hash Table 210, the system may proceed to process new segments without deferring Storage 220 allocation, so as to avoid continuing to fill Hash Table 210. This may continue until, for example, Hash Table 210 becomes more sparse or the load factor is reduced to an acceptable level. At that point, the original process for selecting segments to defer allocation of Storage 220 can resume.

In another embodiment, the predefined criteria that triggers the creation of an entry in Segment Directory 205 and allocation of Storage 220 includes receiving a request to write the particular segment to Storage 220. For example, the entity that created the segment may request that it be written to Storage 220. Further, the segment may need to be written to Storage 220 so that another segment can be swapped into Memory 215, as part of a system that uses page-swapping or segment-swapping to manage Memory 215. Additionally, in some embodiments, another process or entity may request that the segment be written to storage for various reasons. In these embodiments, the allocation of Storage 220 is deferred until it is absolutely necessary, which can save significant computing resources. If a request is received to write the segment to Storage 220, the allocation of Storage 220 is done on demand, when the write is issued, and is entirely transparent to the entity requesting the write.

In embodiments, when it is determined that the predefined criteria have been satisfied for a particular segment, an entry in Segment Directory 205 is created, Storage 220 is allocated, and the corresponding entry in Hash Table 210 is removed, deleted, destroyed, or invalidated. Of course, as discussed above, the predefined criteria that trigger the allocation of Storage 220 can include multiple conditions in a given embodiment, including criteria not discussed herein. In an embodiment, the entire process of selecting segments to defer allocation of Storage 220, deferring such allocation, and the eventual process of actually allocating Storage 220 or deallocating the segment is entirely transparent to the entities that request and use segments.

Figure 2C:
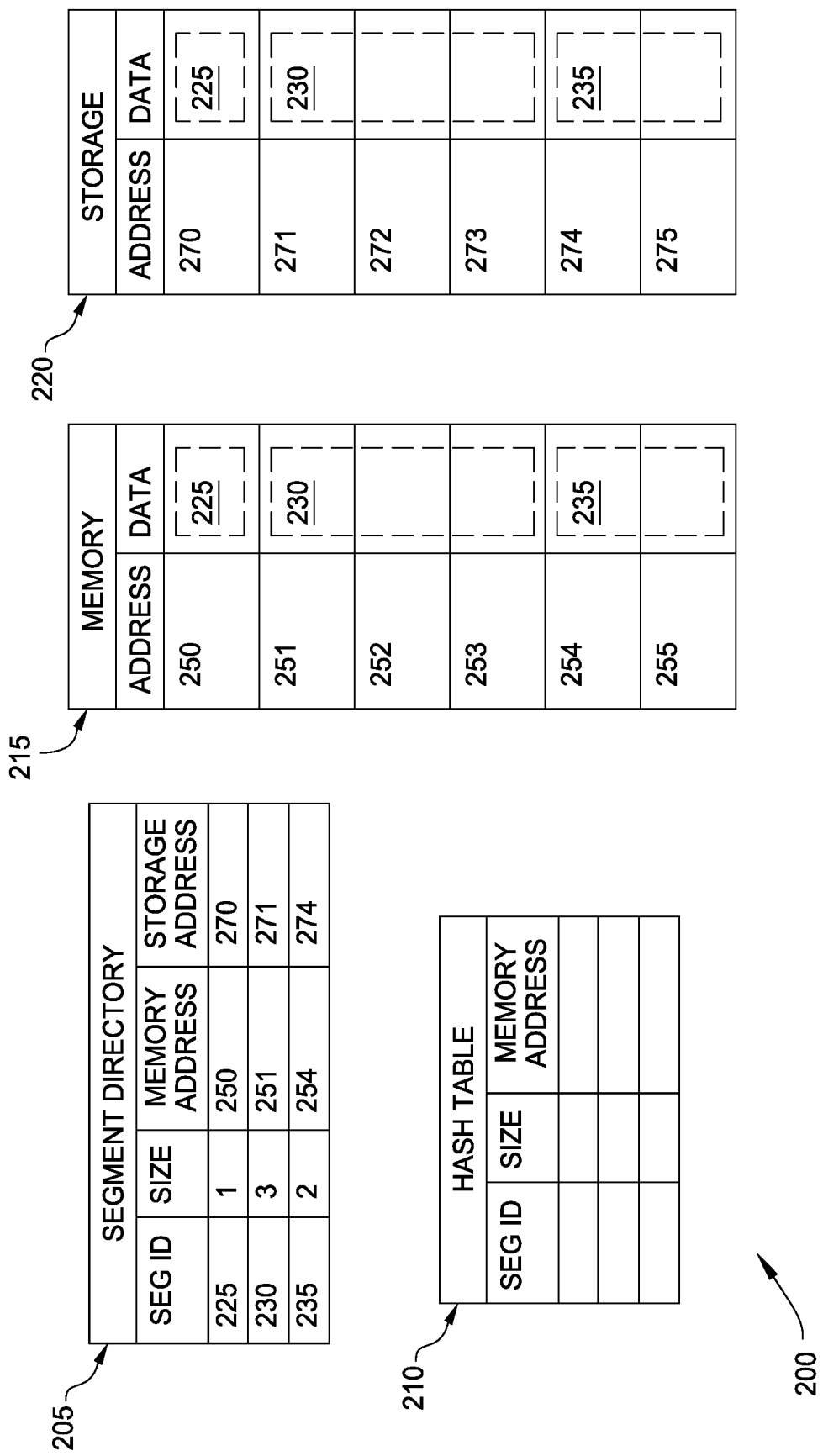
FIG. 2c is a block diagram illustrating deferred allocation of disk storage, according to an embodiment disclosed herein.

Turning now to FIG. 2c, a block diagram of one embodiment of the present disclosure is illustrated. In the illustrated embodiment, Segment 235 which did not have Storage 220 allocated in FIG. 2b, has now been transitioned into being a storage-backed segment. As illustrated, Segment 235 now has an entry in Segment Directory 205, and has been allocated Storage 220. Additionally, the associated entry in Hash Table 210 has been removed. This process may have been triggered by any of the criteria discussed above. For example, a predefined time period may have passed, or a request may have been received to write Segment 235 to Storage 220. In the illustrated embodiment, Segment 230's allocated space in Storage 220 has been moved from Sectors 272-274 to Sectors 271-273. This may be, for example, to reduce disk fragmentation and to allow Segment 235 to be allocated contiguous Sectors 274 and 275.

Figure 3:
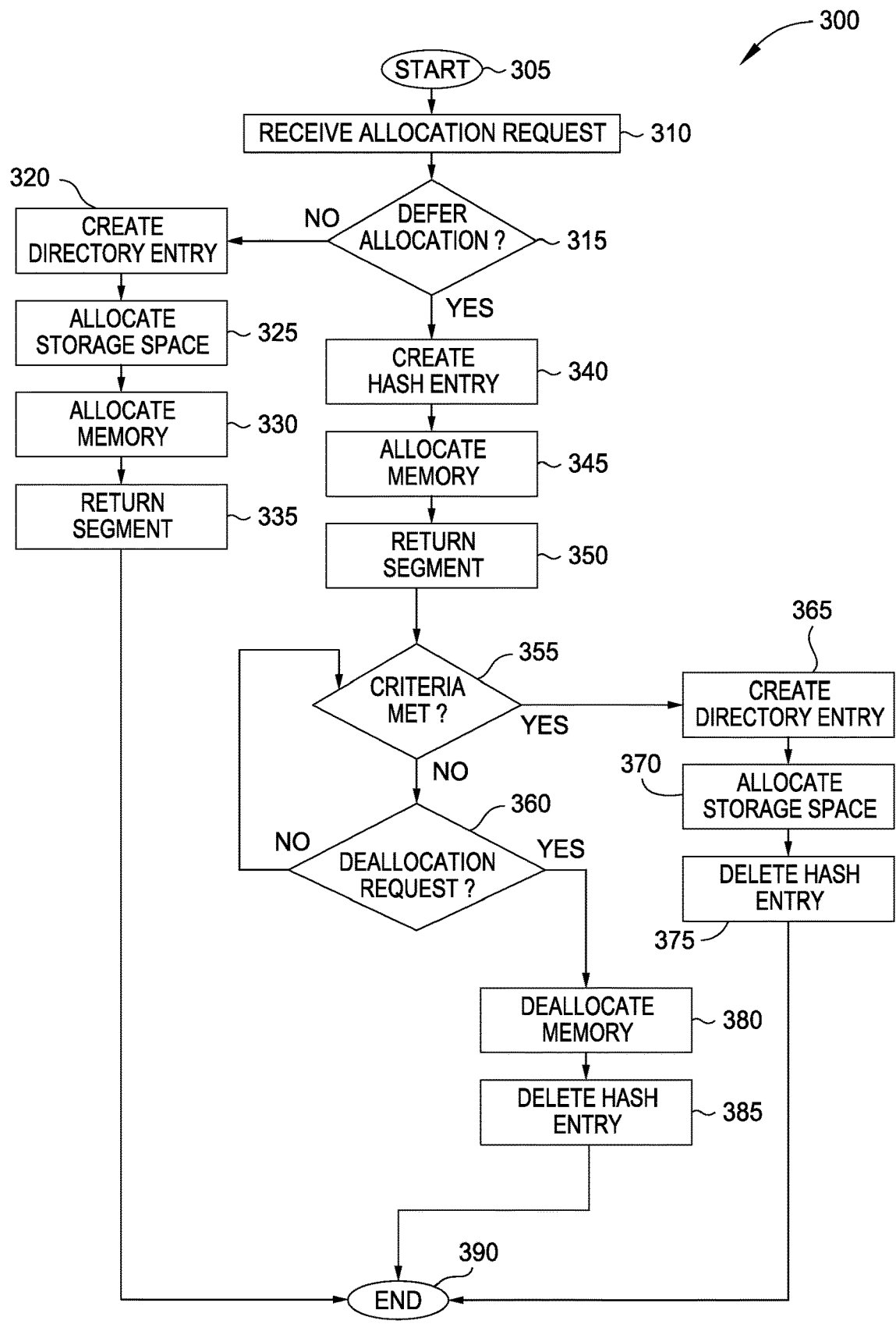
FIG. 3 is a flow diagram illustrating a method for deferring allocation of disk space, according to one embodiment disclosed herein.

FIG. 3 illustrates a flow diagram for a method 300 for deferring allocation of disk space, according to one embodiment. As depicted, the method 300 begins at block 305. At block 310, a request to allocate or create a segment is received. Such a request could be, for example, from an operating system, process, application, client, and the like. At block 315, it is determined whether allocation of Storage 220 should be deferred or not. As discussed above, this determination can be made based on a variety of criteria, including the size of the requested segment, the entity that requested the segment, the load factor of the hash table, and the like. If it is determined that allocation of Storage 220 should not be deferred, the method 300 proceeds to block 320, where a directory entry is created (e.g., an entry in Segment Directory 205). Additionally, Storage 220 is allocated at block 325, and at block 330, Memory 215 is allocated for the segment. Finally, at block 335 the segment is returned to the entity that requested it. That is, a pointer to the segment, an indication that the segment has been created, or some other information that enables access and use of the segment is returned to the requesting entity. Once the segment has been returned, the method 300 ends at block 390.

Although the blocks of the method 300 are illustrated as if they are performed in the illustrated order, some or all of them may in fact occur substantially simultaneously, or in differing orders than illustrated. For example, in some embodiments, Memory 215 is allocated first (block 330), then Storage 220 is allocated (block 325), and finally the directory entry is created (block 320). In other embodiments, allocation of Memory 215 and Storage 220 occurs at substantially the same time. The illustrated embodiment is not intended to limit the present disclosure, and is merely provided as an example of one embodiment.

Returning to block 315, if it is determined that allocation of Storage 220 should be deferred for the requested segment, the method 300 proceeds to block 340. At block 340, a hash entry is created for the segment (e.g., an entry in Hash Table 210). At block 345, memory is allocated for the segment (for example, Memory 215), and at block 350, the segment is returned to the entity that requested it (e.g., information needed to access the segment is sent to the requesting entity). Once the segment has been returned to the requesting entity, the method 300 determines, at block 355, whether criteria to allocate Storage 220 have been met. For example, as discussed above, such criteria could include an age of the segment, a load factor of the hash table, or receiving a request to write the segment out to storage. If the criteria have been satisfied, the method 300 proceeds to block 365.

At block 365, a directory entry for the segment is created. Additionally, at block 370, storage space is allocated for the segment (e.g., Storage 220). At block 375, the hash entry associated with the segment is deleted. Finally, once the segment has had storage allocated for it, the method 300 terminates at block 390. On the other hand, if, at block 355, it is determined that the predefined criteria have not been met, the method 300 proceeds to block 360 to determine whether an indication that the segment should be deallocated has been received. A segment may be deallocated for a variety of reasons. In some embodiments, the entity that requested allocation of the segment may proceed to request deallocation it because it is no longer needed. In some embodiments, the computing system may determine that the segment should be deallocated for various other reasons, such as if it is determined that the segment is abandoned (e.g., because it has not been written to or read from for a period of time) or because the process or entity that created the segment has terminated.

If it is determined that the segment should be deallocated, the method 300 proceeds to block 380, where the memory associated with the segment is deallocated. Next, the entry in Hash Table 210 is destroyed or invalidated at block 385. Finally, the method 300 terminates at block 390. If, however, it is determined that the segment should not be deallocated (e.g., because no request to deallocate it has been received), the method 300 returns to block 355, where it is determined whether the predefined criteria have been met such that Storage 220 should be allocated. In this way, the process 300 continues to loop between blocks 355 and 360 until either the segment is deallocated, or Storage 220 is allocated.

Figure 4:
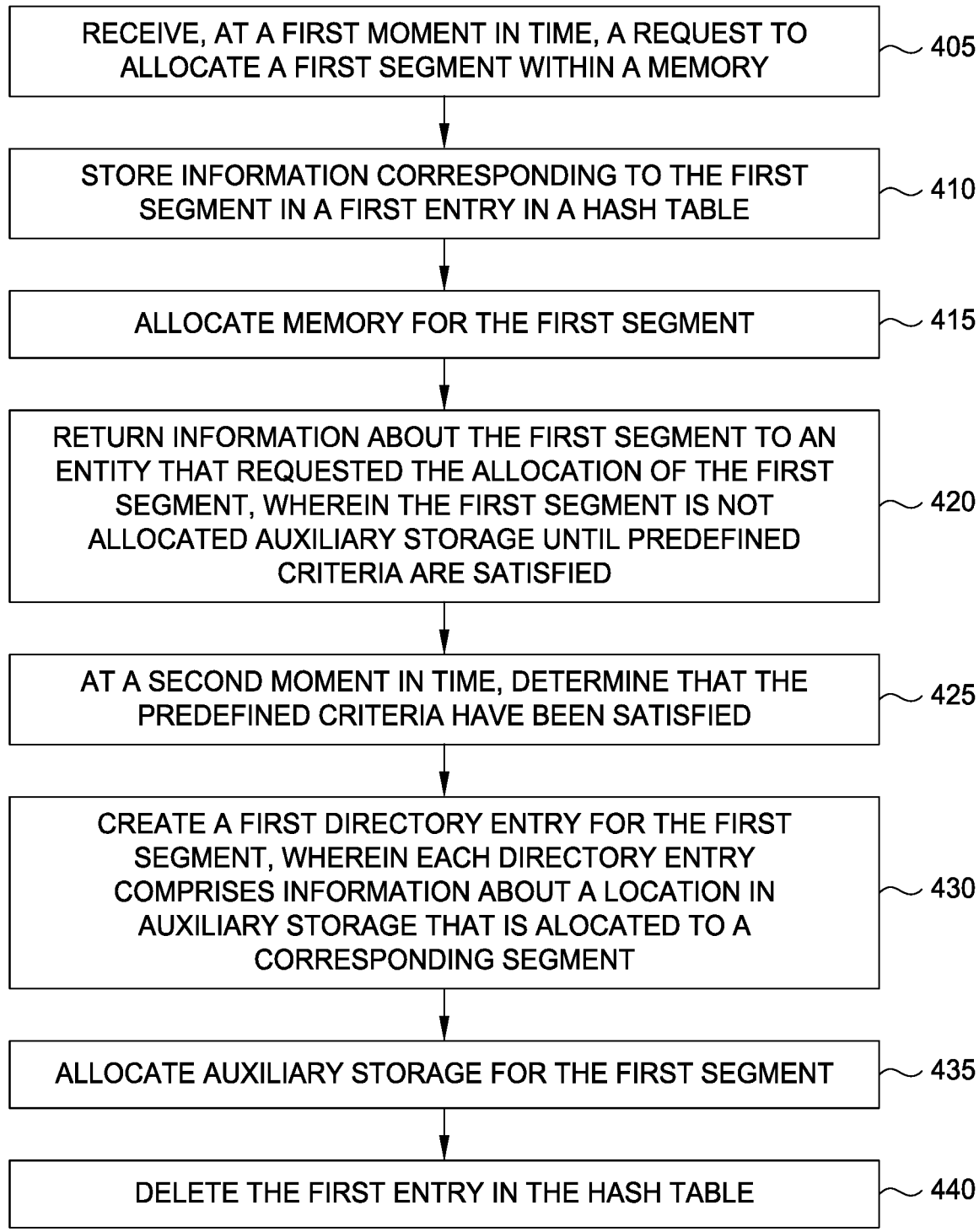
FIG. 4 is a flow diagram illustrating a method for deferring allocation of disk space, according to one embodiment disclosed herein.

FIG. 4 depicts a flow diagram for a method 401 of implementing deferred segment allocation according to one embodiment. The method begins at block 405, where, at a first moment in time, a request to allocate a first segment within a memory is received. At block 410, the system stores information corresponding to the first segment in a first entry in a hash table. Additionally, at block 415, memory is allocated for the first segment. The method 401 proceeds to block 420, where information about the first segment is returned to an entity that requested the allocation of the first segment, wherein the first segment is not allocated auxiliary storage until predefined criteria are satisfied.

Next, the method 401 continues at block 425, where at a second moment in time, it is determined that the predefined criteria have been satisfied. At block 430, the system creates a first directory entry for the first segment, wherein each directory entry comprises information about a location in auxiliary storage that is allocated to a corresponding segment. Additionally, at block 435, auxiliary storage is allocated for the first segment. At block 440, the first entry in the hash table is deleted.

Figure 5:
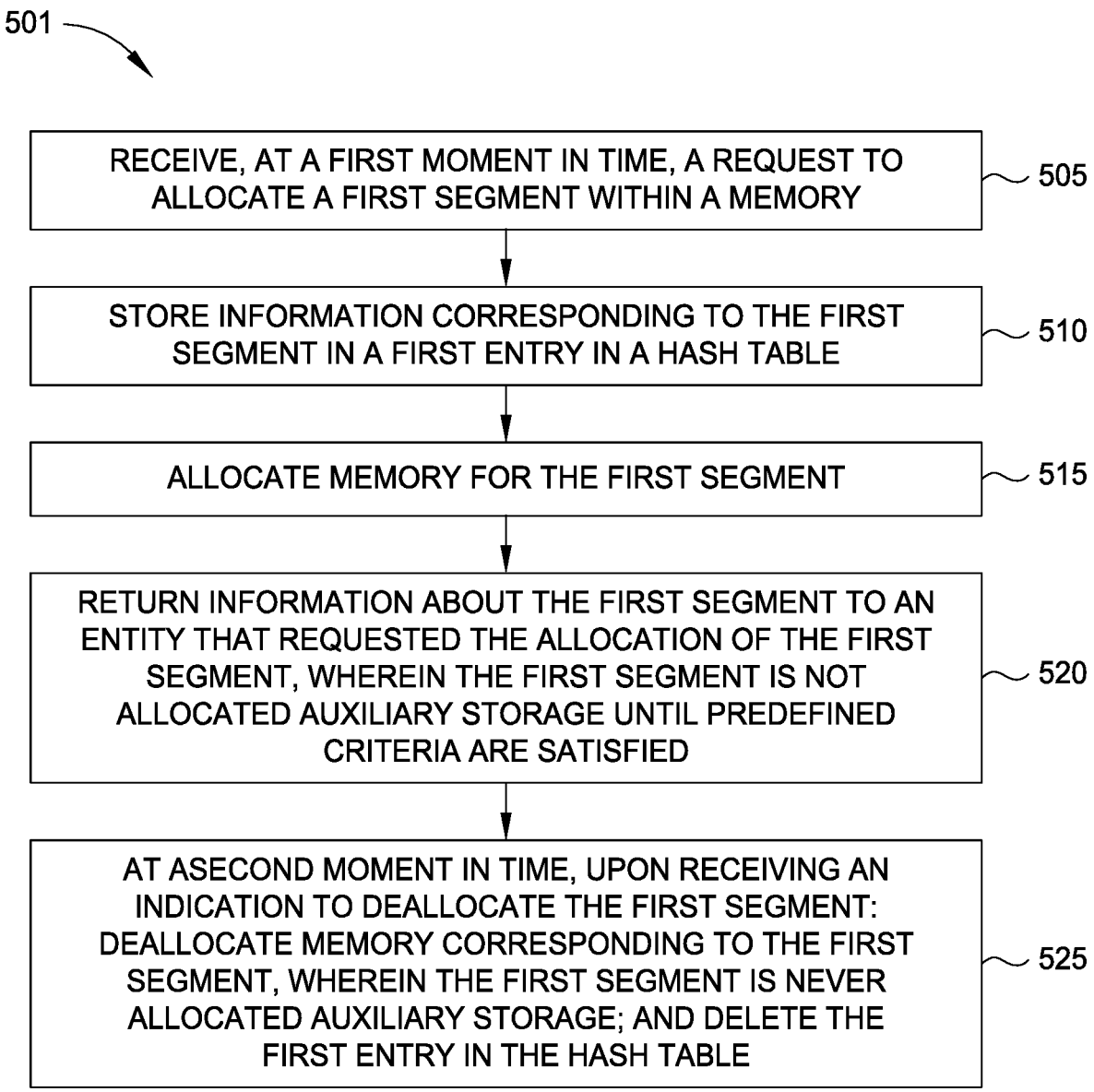
FIG. 5 is a flow diagram illustrating a method for deferring allocation of disk space, according to one embodiment disclosed herein.

FIG. 5 illustrates a method 501 of implementing deferring allocation of storage for segments, according to one embodiment. The method 501 begins at block 505, where at a first moment in time, a request to allocate a first segment within a memory is received. At block 510, information corresponding to the first segment is stored in a first entry in a hash table. Additionally, at block 515, memory is allocated for the first segment. At block 520, information about the first segment is returned to an entity that requested the allocation of the first segment, wherein the first segment is not allocated auxiliary storage until predefined criteria are satisfied. Next, the method 501 proceeds to block 525, where, at a second moment in time, upon receiving an indication to deallocate the first segment, memory corresponding to the first segment is deallocated, wherein the first segment is never allocated auxiliary storage, and the first entry in the hash table is deleted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access storage or memory segments in the cloud. For example, the system could execute on a computing system in the cloud and defer allocation of storage for segments. In such a case, the client could request that a segment be allocated in the cloud, and the system could allocate memory while deferring allocation of storage at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-readable storage medium having computer-readable program code embodied therewith, the computer-readable program code executable by one or more computer processors to perform an operation comprising:
   receiving, at a first moment in time, a request to allocate a first segment within a memory;
   in response to determining to defer a decision to allocate space for the first segment in auxiliary storage, creating a first entry in a hash table and storing information corresponding to the first segment in the first entry, the hash table serving as a temporary storage for the information until determining whether to allocate space in the auxiliary storage for the first segment;
   allocating memory for the first segment;
   returning information about the first segment to an entity that requested the allocation of the first segment, wherein the first segment is not allocated space in the auxiliary storage until predefined criteria are satisfied;
   receiving, at a second moment in time, an indication to deallocate the first segment;
   deallocating the memory corresponding to the first segment in response to the receipt of the indication to deallocate the first segment and a decision to not allocate space in the auxiliary storage for the first segment, wherein the first segment is never allocated space in the auxiliary storage; and
   deleting the first entry in the hash table based on deallocating the memory corresponding to the first segment.

2. The computer-readable storage medium of claim 1, the operation further comprising:
   receiving, at a third moment in time, a request to allocate a second segment within the memory;
   storing information corresponding to the second segment in a second entry in the hash table;
   allocating memory for the second segment;
   returning information about the second segment to an entity that requested the allocation of the second segment, wherein the second segment is not allocated space in the auxiliary storage until predefined criteria are satisfied; and
   at a fourth moment in time, upon determining that the predefined criteria have been satisfied:
      creating a first directory entry for the second segment, wherein each directory entry comprises information about a location in the auxiliary storage that is allocated to a corresponding segment;
      allocating space in the auxiliary storage for the second segment; and
      deleting the second entry in the hash table.

3. The computer-readable storage medium of claim 2, wherein the first and second segments are not allocated space in the auxiliary storage until predefined criteria are satisfied because they are likely to be short-lived.

4. The computer-readable storage medium of claim 3, wherein the first and second segments are likely to be short-lived because a size of the first and second segments is smaller than a predefined threshold.

5. The computer-readable storage medium of claim 4, the operation further comprising:
   receiving, at a fifth moment in time, a request to allocate a third segment within a memory;
   determining that the third segment is not likely to be short-lived because a size of the third segment is longer than the predefined threshold;
   creating a second directory entry for the third segment, wherein each directory entry comprises information about a location in the auxiliary storage that is allocated to a corresponding segment;
   allocating space in the auxiliary storage for the third segment;
   allocating memory for the third segment; and
   returning information about the third segment to an entity that requested the allocation of the third segment.

6. The computer-readable storage medium of claim 1, wherein the predefined criteria is satisfied when a predefined amount of time has passed since the first segment was created.

7. The computer-readable storage medium of claim 1, wherein the predefined criteria is satisfied when a load factor of the hash table exceeds a predefined threshold.

8. The computer-readable storage medium of claim 1, wherein the predefined criteria is satisfied when a request is received to write the first segment to the auxiliary storage.

9. The computer-readable storage medium of claim 1, wherein the first entry in the hash table further comprises an indication that the first segment does not have allocated space in the auxiliary storage.

10. A system comprising:
   a processor; and
   a computer memory storing a program, which, when executed on the processor, performs an operation comprising:

receiving, at a first moment in time, a request to allocate a first segment within a memory;

in response to determining to defer a decision to allocate space for the first segment in auxiliary storage, creating a first entry in a hash table and storing information corresponding to the first segment in the first entry, the hash table serving as a temporary storage for the information until determining whether to allocate space in the auxiliary storage for the first segment;

allocating memory for the first segment;

returning information about the first segment to an entity that requested the allocation of the first segment, wherein the first segment is not allocated space in the auxiliary storage until predefined criteria are satisfied;

receiving, at a second moment in time, an indication to deallocate the first segment;

deallocating the memory corresponding to the first segment in response to the receipt of the indication to deallocate the first segment and a decision to not allocate space in the auxiliary storage for the first segment, wherein the first segment is never allocated space in the auxiliary storage; and deleting the first entry in the hash table based on deallocating the memory corresponding to the first segment.

11. The system of claim 10, the operation further comprising:

receiving, at a third moment in time, a request to allocate a second segment within the memory;

storing information corresponding to the second segment in a second entry in the hash table;

allocating memory for the second segment;

returning information about the second segment to an entity that requested the allocation of the second segment, wherein the second segment is not allocated space in the auxiliary storage until predefined criteria are satisfied; and at a fourth moment in time, upon determining that the predefined criteria have been satisfied:
  creating a first directory entry for the second segment, wherein each directory entry comprises information about a location in the auxiliary storage that is allocated to a corresponding segment;
  allocating space in the auxiliary storage for the second segment; and
  deleting the second entry in the hash table.

12. The system of claim 11, wherein the first and second segments are not allocated space in the auxiliary storage until predefined criteria are satisfied because the first and second segments are likely to be short-lived, wherein the first and second segments are likely to be short-lived because a size of the first and second segments is smaller than a predefined threshold.

13. The system of claim 12, the operation further comprising:

receiving, at a fifth moment in time, a request to allocate a third segment within a memory;

determining that the third segment is not likely to be short-lived because a size of the third segment is longer than the predefined threshold;

creating a second directory entry for the third segment, wherein each directory entry comprises information about a location in the auxiliary storage that is allocated to a corresponding segment;

allocating space in the auxiliary storage for the third segment;

allocating memory for the third segment; and returning information about the third segment to an entity that requested the allocation of the third segment.

14. The system of claim 10, wherein the predefined criteria is satisfied when a predefined amount of time has passed since the first segment was created.

15. The system of claim 10, wherein the predefined criteria is satisfied when either: (i) a load factor of the hash table exceeds a predefined threshold, or (ii) a request is received to write the first segment to the auxiliary storage.

16. A method comprising:

receiving, at a first moment in time, a request to allocate a first segment within a memory;

in response to determining to defer a decision to allocate space for the first segment in auxiliary storage, creating a first entry in a hash table and storing information corresponding to the first segment in the first entry, the hash table serving as a temporary storage for the information until determining whether to allocate space in the auxiliary storage for the first segment;

allocating memory for the first segment;

returning information about the first segment to an entity that requested the allocation of the first segment, wherein the first segment is not allocated space in the auxiliary storage until predefined criteria are satisfied;

receiving, at a second moment in time, an indication to deallocate the first segment;

deallocating the memory corresponding to the first segment in response to the receipt of the indication to deallocate the first segment and a decision to not allocate space in the auxiliary storage for the first segment, wherein the first segment is never allocated space in the auxiliary storage; and deleting the first entry in the hash table based on deallocating the memory corresponding to the first segment.

17. The method of claim 16, further comprising:

receiving, at a third moment in time, a request to allocate a second segment within the memory;

storing information corresponding to the second segment in a second entry in the hash table allocating memory for the second segment;

returning information about the second segment to an entity that requested the allocation of the second segment, wherein the second segment is not allocated space in the auxiliary storage until predefined criteria are satisfied; and at a fourth moment in time, upon determining that the predefined criteria have been satisfied:
  creating a first directory entry for the second segment, wherein each directory entry comprises information about a location in the auxiliary storage that is allocated to a corresponding segment;
  allocating space in the auxiliary storage for the second segment; and
  deleting the second entry in the hash table.

18. The method of claim 17, wherein the first and second segments are not allocated space in the auxiliary storage until predefined criteria are satisfied because they are likely to be short-lived.

19. The method of claim 18, wherein the first and second segments are likely to be short-lived because a size of the first and second segments is smaller than a predefined threshold.

20. The method of claim 16, wherein the predefined criteria is satisfied when either: (i) a predefined amount of time has passed since the first segment was created, (ii) a load factor of the hash table exceeds a predefined threshold, or (iii) a request is received to write the first segment to the auxiliary storage.

\* \* \* \* \*